United States Patent
Habassi et al.

(10) Patent No.: US 7,618,141 B2
(45) Date of Patent: Nov. 17, 2009

(54) POLYMERIZABLE COMPOSITION CONTAINING AN ODOR MASKING AGENT AND A PERFUME, AN OPTICAL LENS AND A PRODUCTION METHOD

(75) Inventors: Chefik Habassi, Ormesson/Marne (FR); Alexandra Roos, Paris (FR); Leang Ly, Neuilly Plaisance (FR)

(73) Assignee: Essilor International (Compagnie Generale d'Optique), Charenton-le-Porte (FR)

( * ) Notice: Subject to any disclaimer, the term of this patent is extended or adjusted under 35 U.S.C. 154(b) by 173 days.

(21) Appl. No.: 11/571,142

(22) PCT Filed: Jun. 21, 2005

(86) PCT No.: PCT/FR2005/050476

§ 371 (c)(1),
(2), (4) Date: Dec. 21, 2006

(87) PCT Pub. No.: WO2006/005874

PCT Pub. Date: Jan. 19, 2006

(65) Prior Publication Data

US 2008/0013042 A1    Jan. 17, 2008

(30) Foreign Application Priority Data

Jun. 21, 2004    (FR) .................. 04 51300

(51) Int. Cl.
*C08G 18/52*    (2006.01)
*C08K 5/06*    (2006.01)
*C08L 81/02*    (2006.01)

(52) U.S. Cl. .......... 351/159; 524/589; 523/102
(58) Field of Classification Search ........... 524/589; 351/159; 523/102
See application file for complete search history.

(56) References Cited

U.S. PATENT DOCUMENTS

| | | | |
|---|---|---|---|
| 3,754,039 A | 8/1973 | Nageli | 568/665 |
| 5,087,758 A * | 2/1992 | Kanemura et al. | 568/57 |
| 5,874,073 A | 2/1999 | Kaiser et al. | 424/70.11 |
| 2003/0125410 A1 * | 7/2003 | Keita et al. | 523/106 |
| 2003/0207786 A1 * | 11/2003 | Miracle et al. | 512/10 |
| 2003/0231280 A1 | 12/2003 | Muisener et al. | 351/159 |
| 2004/0254258 A1 * | 12/2004 | Horikoshi et al. | 523/102 |

FOREIGN PATENT DOCUMENTS

| | | |
|---|---|---|
| JP | 61-147201 | 7/1986 |
| JP | 4-294301 | 10/1992 |
| JP | 5-273401 | 10/1993 |
| JP | 6-49366 | 2/1994 |
| JP | 2003-066383 | 3/2003 |

* cited by examiner

*Primary Examiner*—Mark Eashoo
*Assistant Examiner*—Noah Frank
(74) *Attorney, Agent, or Firm*—Fulbright & Jaworski

(57) ABSTRACT

The invention relates to a composition comprising one or more polymerizable monomers, comprising at least one masking agent selected amongst cyclic ethers and at least one perfume selected amongst naturally occurring musks and extracts thereof, synthetic musks, and mixtures thereof.

25 Claims, No Drawings

POLYMERIZABLE COMPOSITION CONTAINING AN ODOR MASKING AGENT AND A PERFUME, AN OPTICAL LENS AND A PRODUCTION METHOD

This application is a national phase application under 35 U.S.C. § 371 of International Application No. PCT/FR2005/050476 filed 21 Jun. 2005, which claims priority to French Application No. 0451300 filed 21 Jun. 2004. The entire text of each of the above-referenced disclosures is specifically incorporated herein by reference without disclaimer.

The present invention relates to a novel polymerizable composition, an optical lens obtained through polymerization of said composition, as well as a method for preparing a polythiourethane based substrate.

An optical lens, and in particular an ophthalmic lens, results from a succession of moulding and/or surfacing/polishing steps determining the geometry of both convex and concave optical surfaces of said lens, followed by appropriate surface treatments.

The last finishing step for an ophthalmic lens is the trimming operation consisting in machining the edge or the periphery of the lens so as to make it conform to the size required for matching the lens to the glass frame where it is to be arranged.

Trimming generally occurs through grinding or milling.

Such surfacing and trimming steps often generate unpleasant odours. This is specially true when the substrate from which the lens is formed comprises sulphur compounds, such as polythio(meth)acrylates, polythiourethanes or polyepisulfides.

Patent Specification JP 04294301 describes thiomethacrylic resins comprising a cyclic ether as a perfume, for example, 1,8-cineole.

Patent Specification JP 5273401 describes a polythiourethane optical lens resulting from the polymerization of a monomer mixture comprising eucalyptus oil.

Patent Specification JP 6049366 describes a sulphur resin comprising eucalyptus oil for reducing unpleasant odours generated during the resin heat treatment or resin cutting steps.

The aim of the present invention is to provide polymerizable compositions allowing to more efficiently suppress smelling the unpleasant odours released when a lens obtained from the polymerizable composition is being surfaced and/or trimmed.

The Applicant found that using a masking agent selected amongst cyclic ethers and a perfume selected amongst polycyclic or macrocyclic musks in a polymerizable composition allows to suppress in an improved way the unpleasant odours released when a lens is being surfaced and/or trimmed, or to release pleasant odours during such a step.

Thus, the invention has as an object a composition comprising at least one polymerizable monomer, said composition further comprising at least one masking agent selected amongst cyclic ethers and at least one perfume selected amongst naturally occurring musks and extracts thereof, synthetic musks, and mixtures thereof.

Preferably, the synthetic musks to be used herein are monocyclic, polycyclic or macrocyclic musks.

By natural musk, as used herein, it is meant a compound resulting from a secretion extracted from the abdominal pocket of musk-bearing chevrotain *Moschus Moschiferus*.

The preferred monocyclic musks are musks comprising a $C_5$ or $C_6$ ring, preferably comprising at least one ketone or ester group.

The preferred polycyclic musks are musks comprising at least 2 $C_5$ ou $C_6$ hydrocarbon rings, optionally interrupted by one or more oxygen atoms.

The preferred macrocyclic musks are musks comprising a $C_7$-$C_{18}$ hydrocarbon ring, preferably $C_{12}$ or $C_{18}$, and more preferably $C_{15}$, $C_{16}$ or $C_{17}$, optionally interrupted by one or more oxygen atoms.

Such various musk molecules are available from numerous suppliers, such as IFF (International Flavors and Fragrances—Bois Colombes France), Interchim, Sigma Aldrich Chimie (Saint Quentin Fallavier), Aroma and Fine Chemicals (Givaudan), who classified such molecules as musks.

The polymerizable composition according to the invention is particularly efficient when the composition comprises one or more sulphur monomers.

Thus, according to a first embodiment of the invention, the composition comprises one or more monomers selected amongst monomers containing at least one sulphur atom.

Preferably, monomers containing at least one sulphur atom are selected amongst precursor monomers of polythio(meth)acrylates, polythiourethanes, polythiourethane-ureas and polyepisulfides.

The polythio(meth)acrylate precursor monomers for use in the composition according to the invention comprise at least one, preferably two groups of the formula:

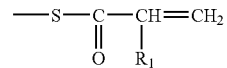

with $R_1$=H or $CH_3$.

They could be represented by the following formula:

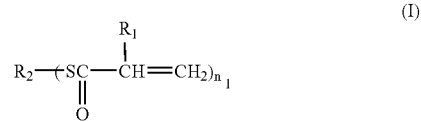

wherein:

$R_2$ represents an aliphatic, linear or branched, univalent or multivalent, hydrocarbon moiety or an aromatic or heterocyclic, univalent or multivalent group directly linked to the sulphur atom of the thio(meth)acrylate group(s) through a core or through a linear alkyl chain, the moiety $R_2$ being likely to bear in its chain one or more groups selected amongst —O—, —S—, —CO—;

$R_1$ represents hydrogen or —$CH_3$; and $n_1$ is an integer from 1 to 6, preferably from 1 to 3.

Amongst the univalent $R_2$ moieties are to be mentioned linear or branched $C_1$-$C_5$ alkyl moieties and the moieties of formula:

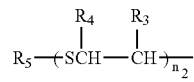

wherein:

$R_3$ and $R_4$ are, independently from one another, H or a linear or branched $C_1$-$C_5$ alkyl moiety;

$R_5$ is a linear or branched $C_1$-$C_5$ alkyl moiety, a $C_7$-$C_{10}$ aralkyl moiety or a $C_6$-$C_{12}$ aryl moiety, optionally substituted, in particular by alkyl and/or halogen groups; and $n_2$ is an integer from 1 to 4.

Amongst the preferred univalent $R_2$ moieties, are to be mentioned:

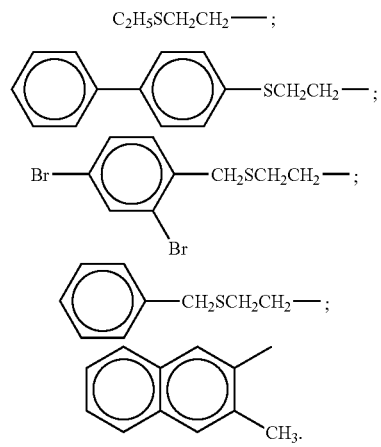

Monomers of formula (I) for which $n_1=1$ and such as hereinabove defined, are described inter alia in Patents U.S. Pat. No. 4,606,864, JP-6,331,766 and EP-A-0,384,725.

Amongst the divalent $R_2$ moieties belonging to the scope of Monomers of formula (I), are to be mentioned linear or branched $C_2$-$C_{10}$ alkylene moieties adapted to comprise in their chain one or more —O—, —S—, —CO— groups; alkylidene moieties of formula:

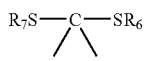

wherein $R_6$ and $R_7$ are $C_1$-$C_5$ alkyl moieties; moieties of formula:

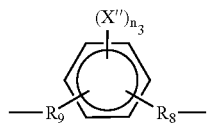

wherein $R_8$ and $R_9$ are linear or branched $C_1$-$C_5$ alkylene groups likely to comprise one or more —O—, —S— or —CO— groups in their chains and X" is selected amongst $C_1$-$C_5$ alkyl moieties and halogens, and $n_3$ is an integer from 0 to 4; and moieties of the formula:

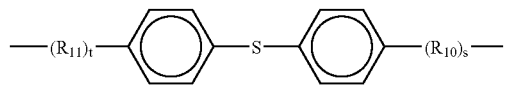

wherein $R_{10}$ and $R_{11}$ are linear or branched $C_1$-$C_5$ alkyl moieties, optionally comprising in their chain one or more —O—, —S— or —CO— groups and t and s are 0 or 1.

Amongst the preferred divalent $R_2$ moieties, are to be mentioned:

—$(CH_2)_{q'}$—, where q' is an integer from 1 to 8;

—$(CH_2CH_2X)_u$—$CH_2CH_2$— where X is —O— or —S—, and u is an integer from 1 to 4;

—$(CH_2)_{u'}$—$[S(CH_2)_{v'}]_{z'}$—$(CH_2)_{w'}$—, where z' is 0 or 1, and u', v', w' are integers from 2 to 6:

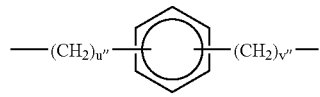

wherein u" and v" are integers from 1 to 4,

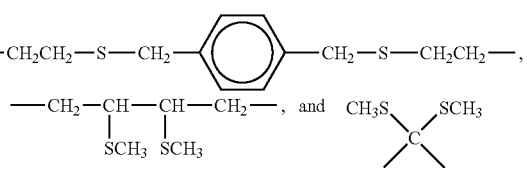

The particularly preferred divalent $R_2$ moieties are:

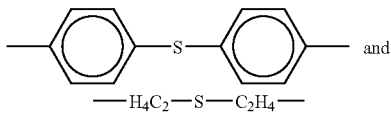

Divalent monomers of formula (I) are described, amongst others, in Patents EP-A-273,661, EP-A-273,710, EP-A-384,725.

Amongst the $R_2$ trivalent moieties of monomers of formula (I), are to be mentioned $C_3$-$C_{10}$ alkyltriyl moieties likely to comprise in their chain one or more —O—, —S— or —CO— groups, trivalent alkylaryl moieties, the alkyl chains of which can comprise one or more —O—, —S— or —O— groups, and trivalent aryl groups.

Amongst trivalent or higher $R_2$ moieties, are to be mentioned:

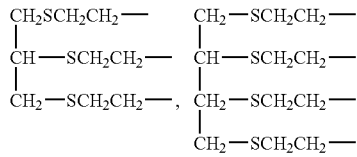

Amongst monomers of formula (I) which are recommended in the present invention, are to be mentioned:

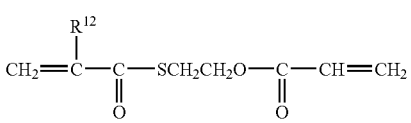

S-2-acryloyloxyethylthio(meth)acrylate,

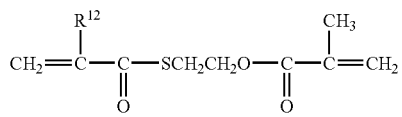

S-2-methacryloyloxyethylthio(meth)acrylate,

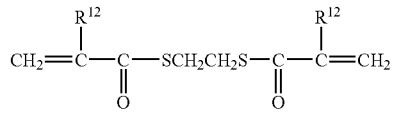

1,2-bis[(meth)acryloylthio]ethane,

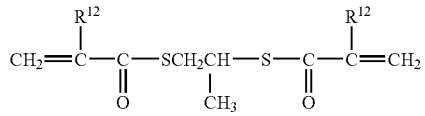

1,2-bis[(meth)acryloylthio]propane,

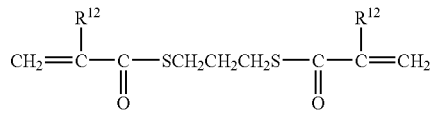

1,3-bis[(meth)acryloylthio]propane,

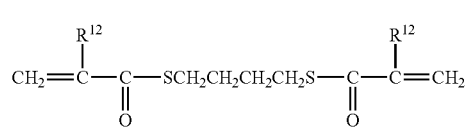

1,4-bis[(meth)acryloylthio]butane,

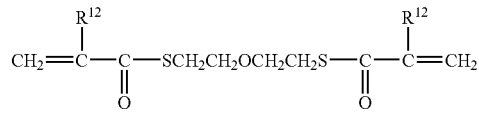

bis-2-[(meth)acryloylthioethyl]ether,

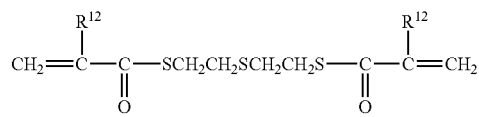

bis-2-[(meth)acryloylthioethyl]sulfide,

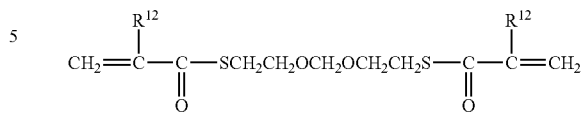

bis-2-[(meth)acryloylthioethoxy]methane,

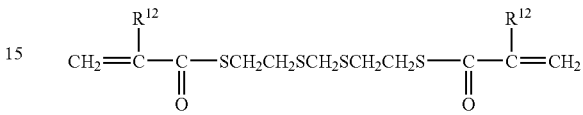

bis-2-[(meth)acryloylthioethylthio]methane,

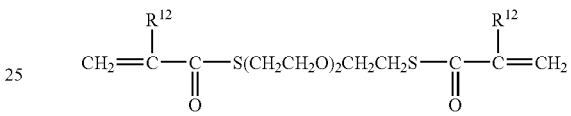

1,2-bis-[2-(meth)acryloylthioethoxy]ethane,

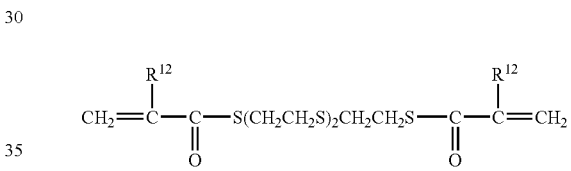

1,2-bis-[2-(meth)acryloylthioethylthio]ethane,

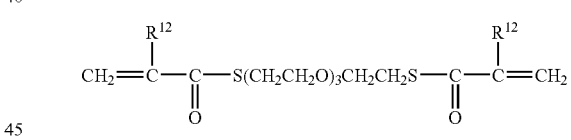

bis-[2-(2-(meth)acryloylthioethoxy)ethyl]ether,

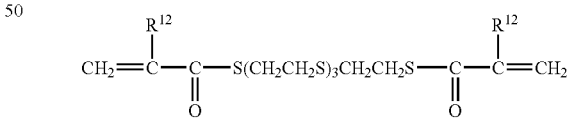

bis-[2-(2-(meth)acryloylthioethylthio)ethyl]sulfide,

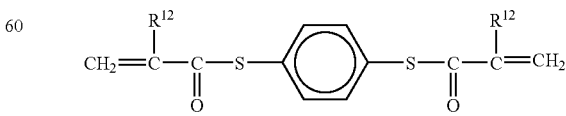

1,4-bis [(meth)acryloylthio]benzene,

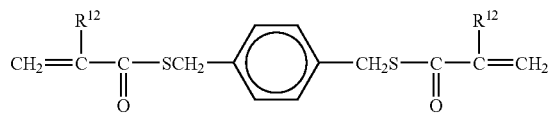

1,4-bis[(meth)acryloylthiomethyl]benzene,

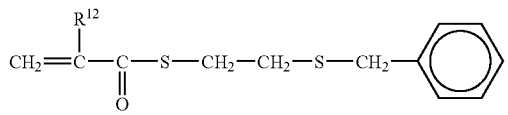

benzylthioethylthio(meth)acrylate,

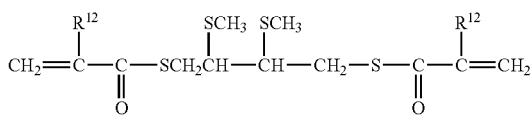

1,4-[bis(meth)acryloylthio]-2,3-dimethylthiobutane,

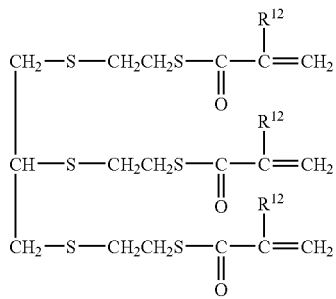

1,2,3-tris[(meth)acryloylthioethyl]thiolpropane, and

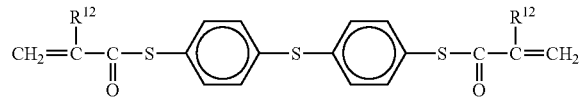

bis[(meth)acryloylthiophenyl]sulfide,
wherein $R^{12}$ is H or $CH_3$.

Another class of thio(meth)acrylic monomers for use in the compositions according to the invention has the following formula:

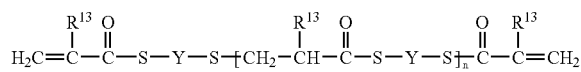

wherein $R^{13}$ represents H or $CH_3$, Y represents an optionally branched $C_2$-$C_{12}$ alkylene group, a $C_3$-$C_{12}$ cycloalkylene group, a $C_6$-$C_{14}$ arylene or a $C_7$-$C_{26}$ alkarylene group, the carbon chain of group Y being likely to be interrupted by one or more ether or thioether groups, and n is an integer from 1 to 6.

Such monomers are described in U.S. Pat. No. 5,384,379.

A recommended polythiomethacrylate monomer is bis(2-metha-cryloylthioethyl]sulfide (BMTES).

Polythio(meth)acrylate precursor monomers useful in the composition according to the invention are described, more particularly, in U.S. Pat. No. 5,741,831.

According to the first embodiment of the invention, the polymerizable composition preferably comprises optionally sulphur-based precursor monomers of poly(thio)urethanes, polyols and/or polythiols and polyiso(thio)cyanates.

In particular, the composition according to the invention preferably comprises at least one polythiol monomer and at least one polyisocyanate monomer.

The polythiol monomers for use for the compositions according to the present invention are well known in the art and could be represented by formula $R'(SH)_{n'}$, wherein n' is an integer from 2 or more, preferably from 2 to 5, and R' is an aliphatic, aromatic or heterocyclic moiety.

Polythiols are described inter alia in EP 394,495.

Polythiols being useful in the composition according to the invention include 9,10-anthracenedimethanethiol, 1,11-undecanedithiol, 4-ethyl-benzene-1,3-dithiol, 1,2-ethanedithiol, 1,8-octanedithiol, 1,18-octadecanedithiol, 2,5-dichlorobenzene-1,3-dithiol, 1,3-(4-chlorophenyl)-propane-2,2-dithiol, 1,1-cyclohexanedithiol, 1,2-cyclohexanedithiol, 1,4-cyclohexanedithiol, 1,1-cycloheptanedithiol, 1,1-cyclopentanedithiol, 4,8-dithioundecane-1,11-dithiol, dithiopentaerythritol, dithiothreitol, 1,3 diphenylpropane-2,2-dithiol, 1,3-dihydroxy-2-propyl-2',3'-dimercapto-propylether, 2,3-dihydroxypropyl-2',3'-dimercaptopropylether, 2,6-dimethyloctane-2,6-dithiol, 2,6-dimethyloctane-3,7-dithiol, 2,4-dimethyl-benzene-1,3-dithiol, 4,5-dimethylbenzene-1,3-dithiol, 3,3-dimethylbutane-2,2-dithiol, 2,2-dimethylpropane-1,3-dithiol, 1,3-di(4-methoxyphenyl)-propane-2,2-dithiol, 3,4-dimethoxybutane-1,2-dithiol, 10,11-dimercapto-undecanoic acid, 6,8-dimercapto-octanoic acid, 2,5-dimercapto-1,3,4-thiadiazole, 2,2'-dimercapto-biphenyle, 4,4'-dimercaptobiphenyle, 4,4'-dimercaptobibenzyle, 3,4-dimercaptobutanol, 3,4-dimercaptobutylacetate, 2,3-dimercapto-1-propanol, 1,2-dimercapto-1,3-butanediol, 2,3-dimercapto-propionic acid, 1,2-dimercaptopropyl-methylether, 2,3-dimercaptopropyl-2',3'-dimethoxypropyether, 3,4-thiophenedithiol, 1,10-decanedithiol, 1,12-docecanedithiol, 3,5,5-trimethylhexane-1,1-dithiol, 2,5-toluenedithiol, 3,4-toluenedithiol, 1,4-napthalenedithiol, 1,5-naphthalenedithiol, 2,6-naphthalenedithiol, 1,9-nonanedithiol, norbomene-2,3-dithiol, bis(2-mercaptoisopropyl)ether, bis(11-mercaptoundecyl)sulfide, bis(2-mercapto-ethyl)ether, bis(2-mercaptoethyl)sulfide, bis(18-mercaptooctadecyl)sulfide, bis(8-mercaptooctyl)sulfide, bis(12-mercapto-decyl)sulfide, bis(9-mercaptononyl)sulfide, bis(4-mercaptobutyl)sulfide, bis(3-mercapto-propyl)ether, bis(3-mercaptopropyl)sulfide, bis(6-mercaptohexyl)sulfide, bis(7-mercaptoheptyl)sulfide, bis(5-mercaptopentyl)sulfide, 2,2'-bis(mercaptomethyl)acetic acid, 1,1-bis(mercaptomethyl)cyclohexane, bis (mercaptomethyl)durene, phenylmethane-1,1-dithiol, 1,2-butanedithiol, 1,4-butanedithiol, 2,3-butanedithiol, 2,2-butanedithiol, 1,2-propanedithiol, 1,3-propanedithiol, 2,2-propanedithiol, 1,2-hexanedithiol, 1,6-hexanedithiol, 2,5-hexanedithiol, 1,7-heptanedithiol, 2,6-heptanedithiol, 1,5-pentane-dithiol, 2,4-pentanedithiol, 3,3-pentanedithiol, 7,8-heptadecanedithiol, 1,2-benzenedithiol, 1,3-benzenedithiol, 1,4-benzenedithiol, 2-methyl-cyclohexane-1,1-dithiol, 2-methylbutane-2,3-dithiol, ethylene glycol dithioglycolate, ethylene glycol bis(3-mercaptopropionate). Amongst trithiols, are to be mentioned, 1,2,3-propanetrithiol, 1,2,4-butanetrithiol, trimethylolpropanetrithiol glycolate, trimethylopropane tris(3-mercaptopropionate), pentaerythritol trithioglycolate, pentaerythritol tris(3-mercaptopropionate), 1,3,5-benzenetrithiol, and 2,4,6-mesitylenetrithiol.

Polythiols useful in the compositions of the present invention also include neopentane tetrathiol, 2,2'-bis(mercaptomethyl)-1,3-propanedithiol, pentaerythritol tetrakis(3-mercaptopropionate), 1,3,5-benzenetrithiol, 2,4,6-toluenetrithiol, 2,4,6-methylenetrithiol, and polythiols corresponding to the formulae:

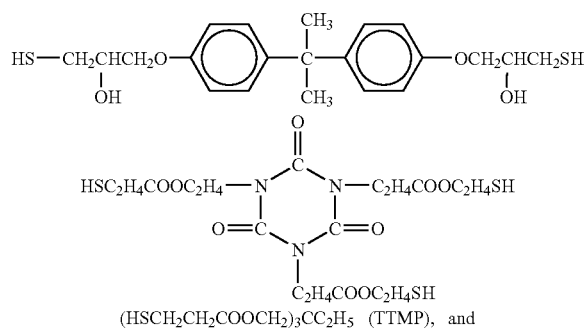

4-mercaptomethyl-3,6-dithia-1,8-octanedithiol.

A preferred polythiol is the compound of the following formula:

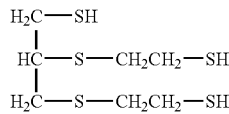

The polyisocyanate compounds useful in the composition according to the invention could all be polyisocyanates generally used for formulating polyurethanes.

Aliphatic compounds include in particular ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethylotane, 2,5,7-trimethyl-1,8-diisocyanato-5-isocyanato-methyloctane, bis(isocyanatoethyl)carbonate, bis(isocyanatoethyl)ether, 1,4-butyleneglycol dipropylether-ω,ω'-diisocyanate, lysine diisocyanatomethyl ester, lysine triisocyanate, 2-isocyanatoethyl-, 2,6-diisocyanato hexanoate, 2-isocyanatopropyl-2,6-diisocyanato hexanoate, xylylene diisocyanate, bis(isocyanatoethyl)benzene, bis-(isocyanatopropyl)benzene, a, a, a',a'-tetramethylxylylene diisocyanate, bis(isocyanatobutyl)benzene, bis-(isocyanatomethyl)napthalene, bis(isocyanatomethyl)-diphenyl ether, bis (isocyanatoethyl)phthalate, mesitylylene triisocyanate and 2,6-di(isocyanatomethyl)furane; alicyclic polyisocyanates such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)-pentaerythritol, dimer acid diisocyanate, 2-isocyanatomethyl-3-(3-isocyanatopropyl)-5-isocyanatomethyl-bicyclo-(2,2,1)-heptane, 2-isocyanatomethyl-2-(3-isocyanatopropyl)-6-isocyanatomethyl-bicyclo-(2,2,1)-heptane, 2-isocyanatomethyl-2-(3-isocyanatopropyl)-5-isocyanatomethyl-bicyclo-(2,2,1)-heptane, 2-isocyanatomethyl-3-(3-isocyanatopropyl)-6-isocyanatomethyl-bicyclo-(2,2,1)-heptane, 2-isocyanatomethyl-3-(3-isocyanato-propyl)-5-(2-isocyanatomethyl)-bicyclo-(2,2,1)-heptane, 2-isocyanato-methyl-3-(3-isocyanatopropyl)-6-(2-isocyanatoethyl)-bicyclo-(2,2,1)-heptane, 2-isocyanatomethyl-2-(3-isocyanatopropyl)-5-(2-isocyanatoethyl)-bicyclo-(2,2,1)-heptane and 2-isocyanatomethyl-2-(3-isocyanatopropyl)-6-(2-isocyanatoethyl)-bicyclo-(2,2,1)-heptane; and aromatic compounds such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethoxybiphenyl-4,4'-diisocyanate, triphenylmethane triisocyanate, polymeric MDI, naphtalene triisocyanate, diphenylmethane-2,4,4'-triisocyanate, 3-methyldiphenylmethane-4,6,4'-triisocyanate, 4-methyl-diphenylmethane-3,5,2',4',6'-pentaisocyanate, phenylisocyanatomethyl isocyanate, phenylisocyanatoethyl isocyanate, tetrahydronaphthylene diisocyanate, hexahydrobenene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofurane diisocyanate, carbazole diisocyanate, ethylcarbazole diisocyanate and dichlorocarbazole diisocyanate; sulfide containing aliphatic polyisocyanates such as thiodiethyl diisocyanate, thiodipropyl diisocyanate, thiodihexyl diisocyanate, dimethylsulfone diisocyanate, dithiodimethyl diisocyanate, dithiodiethyl diisocyanate, and dithiodipropyl diisocyanate; sulphur aromatic polyisocyanates such as diphenylsulfide-2,7'-diisocyanate, diphenylsulfide-4,4'-diisocyanate, 3,3'-dimethoxy-4,4,-diisocyanato-dibenzylthioether, bis(4-isocyanatomethylphenyl)sulfide, and 4,4-methoxyphenylthioethyleneglycol-3,3'-diisocyanate, diphenyldisulfide-4,4'-diisocyanate, 2,2'-dimethyldiphenyldisulfide-5,5'-diisocyanate, 3,3'-dimethyldiphenylsulfide-6,6'-diisocyanate, 4,4'-dimethylphenyldisulfide-5,5'-diisocyanate, 3,3'-dimethoxydiphenyldisulfide-4,4'diisocyanate, and 4,4'-dimethoxy-diphenyldisulfide-3,3'-diisocyanate; diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyl-diphenylsulfone-2,4'-diisocyanate, 4,4'-dimethoxydiphenylsulfone-3,3'-diisocyanate, 3,3'-dimethoxy-4,4'-diisocyanatodibenzyl sulfone, 4,4'-dimethyldiphenylsulfone-3,3'-diisocyanate, 4,4'-ditert-butyldiphenylsulfone-3,3'-diisocyanate, 4,4'-methoxyphenylethylenedisulfone-3,3'-diisocyanate; 4-methyl-3-isocyanato-phenylsulfonyl-4'-isocyanatophenol ester and 4-methoxy-3-isocyanatophenylsulfonyl-4'-isocyanatophenyl ester; aromatic polyisocyanates containing a sulfonamide group such as 4-methyl-3-isocyanatophenylsulfonylanilide-3'-methyl-4'-isocyanate, diphenylsulfonylethylenediamine-4,4'-diisocyanate, 4,4'-methoxyphenylsulfonylethylene-diamine-3,3'-diisocyanate, and 4-methyl-3-isocyanato-phenylsulfonylanilide-4-methyl-3'-isocyanate; and heterocyclic sulphur-containing compounds such as thiophene-2,5-diisocyanate; and 1,4-dithian-2,5-diisocyanate.

A preferred polyisocyanate is the compound of the following formula: $C_6H_4(CH_2NCO)_2$.

Polythiol and polyisocyanate polymerizable compositions useful according to the invention are described in particular in U.S. Pat. Nos. 5,087,758, 5,191,055 and 4,775,733.

Monomers useful in the composition could be also selected amongst polythiourethane-urea precursor monomers.

Polymerizable compositions leading to polythiourethane-urea based substrates are described for example in Patent International Application WO 03/042270.

Monomers useful in the composition of the invention could be also selected amongst polyepisulfide precursor monomers.

Polymerizable compositions of episulfide monomers are described amongst others in documents EP 874,016 and EP 0,942,027.

Preferably, polymerizable monomers having at least one episulfide functionality are compounds having one or more episulfide structures represented by the hereinafter formula in a molecule:

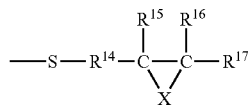

wherein $R^{14}$ represents a hydrocarbon group having from 1 to 10 carbon atoms, $R^{15}$, $R^{16}$ and $R^{17}$ each represents a hydrogen atom or a hydrocarbon group having from 1 to 10 carbon atoms, X represents S or O, with the provisio that in the molecule, the average number of S represented by X should be preferably either about 50% or more of the total number of S and O constituting the 3-membered ring.

A preferred class of polymerizable episulfide monomers is represented by compounds of formula:

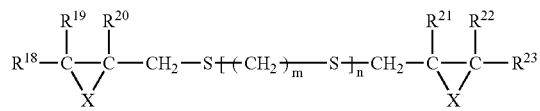

wherein $R^{18}$, $R^{19}$, $R^{20}$, $R^{21}$, $R^{22}$ and $R^{23}$ each represents a hydrogen atom or a hydrocarbon group having 1 to 10 carbon atoms; X represents S or O with the proviso that in the molecule, the mean number of S represented by X is approximately 50% or more of the total number of S and O constituting 3-membered rings, m represents an integer from 0 to 6 and n represents an integer from 0 to 4.

Preferably, $R^{14}$ represents a methylene or ethylene group and $R^{15}$, $R^{16}$ and $R^{17}$ and $R^{18}$, $R^{19}$, $R^{20}$, $R^{21}$, $R^{22}$ and $R^{23}$ preferably each represent a hydrogen atom or a methyl group. Still preferably, $R^{14}$ represents a methylene group and $R^{15}$, $R^{16}$, $R^{17}$, $R^{18}$, $R^{19}$, $R^{20}$, $R^{21}$, $R^{22}$ and $R^{23}$ each represent a hydrogen atom.

The mean number of S is 50% or more, preferably 90% or more, more preferably 95% or more ideally 100% of the total number of S and O constituting the 3-membered rings.

Examples of such compounds include linear organic compounds such as bis(β-epithiopropylthio)methane, 1,2-bis(β-epithiopropyl-thio)ethane, 1,3-bis(β-epithiopropylthio)propane, 1,2-bis(β-epithio-propylthio)propane, 1-(β-epithio propylthio)-2-(β-epithiopropylthio-methyl)propane, 1,4-bis (β-epithiopropyl thio)butane, 1,3-bis(β-epithiopropylthio) butane, 1-(β-epithiopropylthio)-3-(β-epithiopropylthio-methyl)butane, 1,5-bis(β-epithiopropylthio)pentane, 1-(β-epithiopropyl-thio)-4-(β-epithiopropylthiomethyl)pentane, 1,6-bis(β-epithio propylthio)-hexane, 1-(β-epithiopropylthio)-5-(β-epithiopropylthiomethyl) hexane, 1-(β-epithiopropylthio)-2-[(2-β-epithiopropylthioethyl) thio]ethane and 1-(β-epithiopropylthio)-2-[[2-(2-β-epithiopropylthioethyl)thioethyl]thio]ethane; branched organic compounds such as tetrakis(β-epithio propylthio-methyl)methane, 1,1,1-tris (β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithia-octane, 1,8-bis(β-epithiopropylthio)-4,5-bis(β-epithiopropylthiomethyl)-3,6-dithia-octane, 1,8-bis(β-epithiopropylthio)-4,4-bis(β-epithiopropylthiomethyl)-3,6-dithiaoctane, 1,8-bis(βepithiopropylthio)-2,4,5-tris (βepithiopropyl-thiomethyl)-3,6-dithiaoctane, 1,8-bis (βepithiopropylthio)-2,5-bis(βepithiopropylthiomethyl)-3, 6-dithiaoctane, 1,9-bis(βepithiopropylthio)-5-(β-epithiopropylthiomethyl)-5-[(2-β-epithiopropylthioethyl) thiomethyl]-3-7-dithianonane, 1,10-bis (βepithiopropylthio)-5,6-bis[2-βepithiopropyl-thioethyl) thio]-3,6,9-trithiadecane, 1,11-bis(β-epithiopropylthio)-4,8-bis(β-epithiopropylthiomethyl)-3,6,9-trithiaundecane, 1,11-bis(β-epithiopropyl-thio)-5,7-bis(β-epithiopropylthio methyl)-3,6,9-trithiaundecane, 1,11-bis(β-epithiopropylthio)-5,7-[(2-β-epithiopropylthio)thiomethyl]-3,6,9-trithiaundecane and 1,11-bis(β-epithiopropylthio)-4,7-bis(β-epithiopropylthio-methyl)-3,6,9-trithiaundecane; and compounds obtained by substitution of at least one hydrogen atom of the episulfide group by a methyl group, cycloaliphatic organic compounds such as 1,3- and 1,4-bis(β-epithio-propylthio)cyclohexanes, 1,3- and 1,4-bis(β-epithiopropylthio-methyl)cyclohexanes, bis[4-(β-epithiopropylthio) cyclohexyl]methane, 2,2-bis[4-(β-epithiopropylthio) cyclohexyl]propane, bis[4-(β-epithiopropylthio)-cyclohexyl]sulfide, 2,5-bis(β-epithiopropylthiomethyl)-1,4-dithiane; and 2,5-bis(β-epithiopropylthioethylthiomethyl)-1, 4-dithiane; and compounds obtained by substituting at least one hydrogen atom of the episulfide group by a methyl group.

A preferred episulfide compound is bis(β-epithiopropyl) sulfide of the formula:

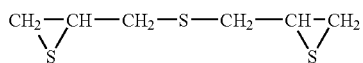

As previously indicated, the polymerizable composition is particularly efficient when the composition comprises sulphur monomers.

However, it is also possible to use the specific mixture of one or more masking agents and of one or more perfumes in the composition according to the invention when there is no sulphur atom in the monomer(s). In such a case, the perfuming function of the perfume has a prevailing role compared to the masking agent.

According to such a second embodiment, the monomer(s) useful in the composition according to the invention are preferably selected amongst precursor monomers of polyallyl compounds, poly(meth)acrylates, styrene/(meth)acrylate copolymers, butadiene/(meth)acrylate copolymers, polyurethanes, polyurethanes-ureas, polyepoxydes and polycarbonates.

The precursor monomers of poly(meth)acrylates useful in the composition according to the invention could all be precursor monomers of the poly(meth)acrylates currently used for manufacturing ophthalmic lenses, and in particular di-, tri- or tetra(meth)acrylate monomers. Preferably, the monomer is a di(meth)acrylate. Examples of preferred di(meth)acrylates include alkylene glycol di(meth)acrylates, preferably ethylene glycol di(meth)acrylate and propylene glycol di(meth)acrylate, polyalkylene glycol di(meth)acrylates, preferably polyethylene glycol di(meth)acrylates and polybutylene glycol di(meth)acrylates, neopentyl glycol di(meth)acrylate, and the derivatives of bisphenol-A di(meth)acrylates.

Examples of precursor monomers of butadiene/(meth)acrylate copolymers include precursor monomers of poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), and poly(butylacrylate-butadiene).

As previously indicated, the composition comprises at least one masking agent selected amongst cyclic ethers.

Preferably, the masking agent(s) is/are selected amongst polycyclic ethers, more preferably bicyclic ethers.

A particularly preferred masking agent is the 1,8-cineole (also referred to as Eucalyptol) of the formula:

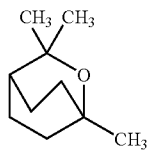

Another example of a masking agent is the 1,4-cineole of the formula:

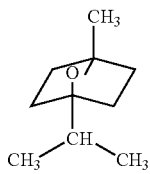

The masking agent(s) preferably represent 0.1 to 3, more preferably 0.5 to 1.5, and most preferably 0.8 to 1 parts in weight for one hundred parts in weight of polymerizable monomers.

In addition to masking agents, the composition according to the invention comprises at least one perfume selected amongst naturally occurring or synthetic musks and preferably synthetic musks such as monocyclic, polycyclic or macrocyclic musks.

An example of a monocyclic musk is as follows:

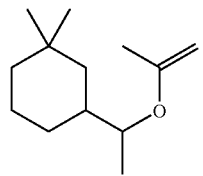

(marketed under the designation Rosamusk®)

Polycyclic musks being the preferred musks for the invention could be selected amongst compounds of formulae:

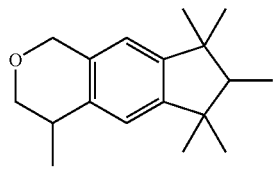

(CAS No.: 1222-05-5, marketed under the designation Galaxolide®)

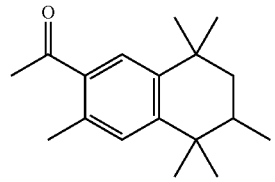

(CAS No.: 1506-02-1, marketed under the designation Tetralide®)

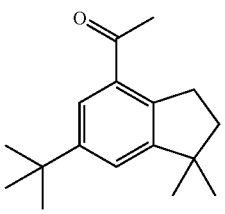

(CAS No.: 13171-00-1, marketed under the designation Celestolide®)

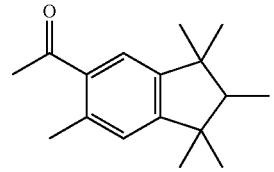

(CAS No.: 15323-35-0)

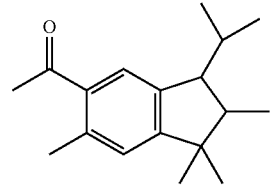

(CAS No.: 68140-48-7)

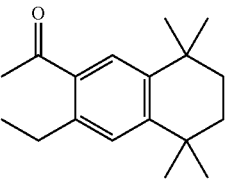

(CAS No.: 88-29-9)

-continued

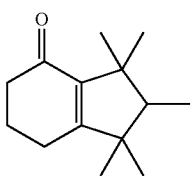

(CAS No.: 33704-61-9, marketed under the designation Cashmeran®)

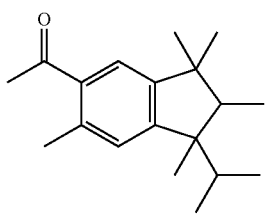

(CAS No.: 92836-10-7)

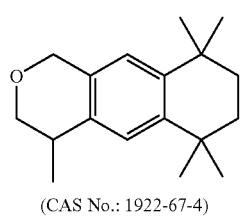

(CAS No.: 1922-67-4)

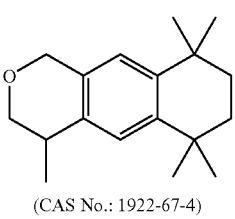

(CAS No.: 68298-33-9)

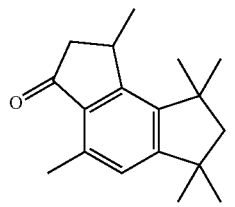

(CAS No.: 96792-67-5)

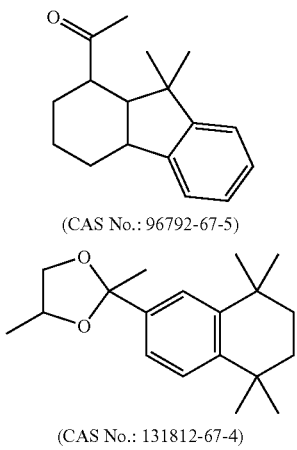

(CAS No.: 131812-67-4)

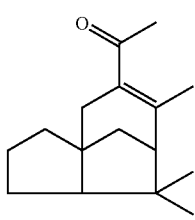

(CAS No.: 32388-55-9 marketed under the designation Vertofix®Cœur)

Macrocyclic musks could be selected amongst the compounds of formulae:

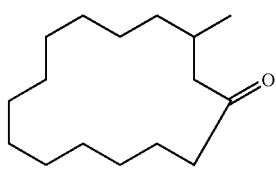

(CAS No.: 541-91-3)

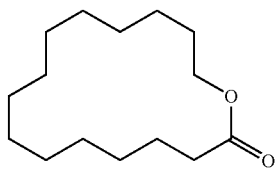

(CAS No.: 106-02-5, marketed under the designation Exaltolide®)

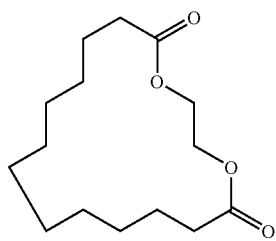

(CAS No.: 105-95-3, marketed under the designation Musk T®)

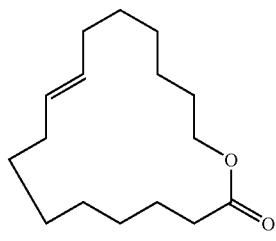

(CAS No.: 28645-51-4, marketed under the designation Ambrettolide®)

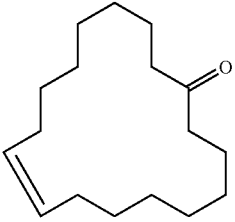

(CAS No.: 542-46-1)

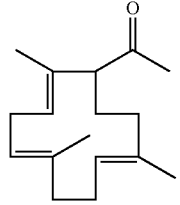

(CAS No.: 144 020-22-4 marketed under the designation Trimofix®)

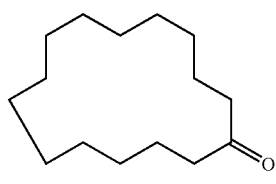

(CAS No.: 502-72-7)

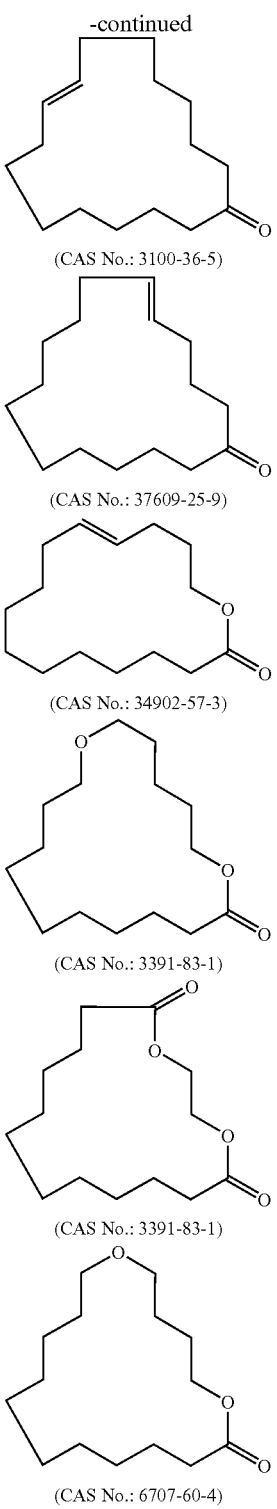

(CAS No.: 3100-36-5)

(CAS No.: 37609-25-9)

(CAS No.: 34902-57-3)

(CAS No.: 3391-83-1)

(CAS No.: 3391-83-1)

(CAS No.: 6707-60-4)

Advantageously, the perfume(s) represent(s) from 0.02 to 3, preferably from 0.1 to 3, more preferably from 0.2 to 1.5 and most preferably from 0.3 to 1 parts in weight for one hundred parts in weight of polymerizable monomers.

According to another embodiment of the invention, the composition according to the invention further comprises at least one aldehyde derivative.

The aldehyde derivative(s) is/are generally selected amongst unsaturated $C_4$-$C_{14}$ aldehyde derivatives. Cis-4-decenal and cis-4-heptenal are particularly to be mentioned.

Advantageously, the aldehyde derivative(s) represent(s) $5 \times 10^{-3}$ to 1, preferably 0.02 to 0.5 and more preferably 0.02 to 0.1 parts in weight for one hundred parts in weight of polymerizable monomers.

According to another embodiment of the invention, the composition according to the invention further comprises an additional compound P, said additional compound P being a perfume, or a mixture thereof, different from the previously defined perfumes, and selected amongst terpenes, aliphatic or aromatic esters, non aromatic bicyclic compounds comprising at least one double intracyclic link, or the mixtures thereof.

The additional compound P preferably comprises from 60 to 90% in weight of terpene, from 2 to 15% in weight of aliphatic or aromatic ester and from 2 to 10% in weight of non aromatic bicyclic compound comprising at least one double intracyclic link.

Preferably, terpenes are limonenes, more preferably a limonene R(+).

The aliphatic or aromatic esters could be selected amongst ethyl methylphenyl glycidate, ethyl hexanoate and the mixtures thereof.

A non aromatic bicyclic compound comprising at least one double intracyclic link is for example caryophyllene.

Generally, the additional compound P represents 0.05 to 1, more preferably 0.1 to 0.5 parts in weight for one hundred parts in weight of polymerizable monomers.

A preferred additional compound P is Plastodor®, comprising the following compounds (in weight):

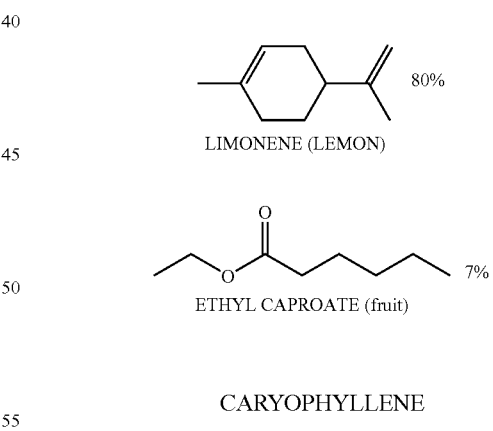

LIMONENE (LEMON) 80%

ETHYL CAPROATE (fruit) 7%

CARYOPHYLLENE

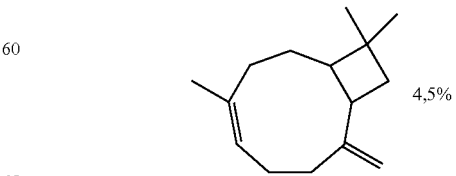

4,5%

ETHYL METHYLPHENYL GLYCIDATE (Fruit Smell: Strawberry)

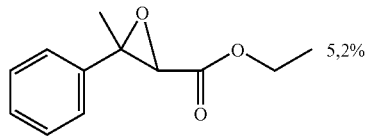 5,2%

When the composition according to the invention does not comprise any aldehyde derivative nor additional compound P, the masking agent(s) and the perfume(s) represents together preferably at least 1.5 parts in weight for one hundred parts in weight of polymerizable monomers.

When the composition according to the invention comprises one or more aldehyde derivatives and/or additional compound P, the masking agent(s) and the perfume(s) represents together preferably at least 1,1 parts in weight for one hundred parts in weight of polymerizable monomers.

The polymerizable compositions according to the invention could also comprise additives conventionally used in polymerizable compositions for moulding optical items, in particular spectacle lenses, in conventional proportions, i.e. inhibitors, colorants, UV absorbers, antioxidants, and anti-yellowing absorbers.

Preferred examples of antioxidants are triphenylphosphine (TPP) and Irganox® 1010 (pentaerythritol-tetrakis [3(3,5-di-tert-butyl-4-hydroxyphenyl)proprionate] (CG1010).

The composition according to the invention could comprise one or more polymerization initiators. For the polycondensation polymerizable systems, tin-based catalysts are preferably used, such as tin dibutyldilaurate. When the composition is polymerizable by radical initiation, preferably photoinitiators are used or mixtures of photoinitiators and thermal initiators, in a proportion of 0.001 to 5% in weight based on the total weight of polymerizable monomers contained in the composition.

Examples of photoinitiators useful in the polymerizable compositions according to the invention include 2,4,6-trimethylbenzoyl-diphenylphosphine oxide (TPO), 1-hydroxycyclohexylphenyl-ketone, 2,2-dimethoxy-1,2-diphenylethane 1-one, alkylbenzoylethers, the photoinitiator as marketed by the CIBA-GEIGY corporation under the designation CGI 1700, being a 25/75 mixture of a compound having the following formula:

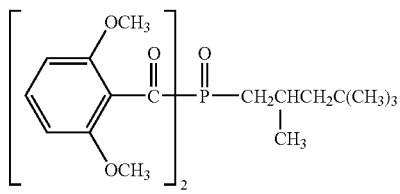

and a compound of the formula:

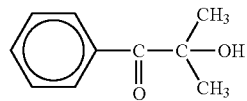

and the photoinitiator CGI 1850 marketed by the CIBA GEIGY corporation being a (50/50) mixture (in weight) of compound A and Irgacure® 184 having as a formula:

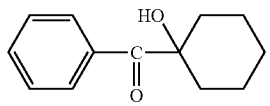

As previously indicated, the preferred polymerizable compositions according to the invention are photopolymerizable compositions comprising one or more photoinitiators.

Still preferably, the polymerizable compositions according to the invention are photo- and thermopolymerizable compositions comprising both a polymerization photoinitiator and a polymerization thermal initiator.

The thermal polymerization initiators are compounds well known in the art and amongst which there are to be mentioned peroxides such as benzoyl peroxide, cyclohexyl peroxidicarbonate, isopropyl peroxy-dicarbonate and t-butylperoxy(2-ethyl hexanoate).

Another object of the invention is an optical lens obtained through polymerization of the composition such as previously defined.

In particular, the optical lens could be an ophthalmic lens, more preferably a spectacle lens.

Finally, the invention has as an object a method for preparing a polythiourethane based substrate, comprising the following steps of:
preparing a first mixture comprising at least one polythiol monomer, at least one masking agent selected amongst cyclic ethers and at least one perfume selected amongst polycyclic or macrocyclic musks,
preferably cold-mixing at least one polyisocyanate monomer with said first mixture so as to form the main mixture, and
polymerizing said main mixture.

By cold mixing it is meant a mixture achieved at a temperature below 15° C., preferably at a level of 10° C., so as to avoid polymerization.

Preferably, the polyisocyanate monomer is previously mixed with at least one catalyst.

Alternatively, said polythiol monomer(s) as well as the polyisocyanate monomer(s) could be mixed, and then at least one masking agent selected amongst cyclic ethers and at least one perfume selected amongst polycyclic or macrocyclic musks could be added.

The catalyst(s) could be selected amongst the catalysts generally used for polymerizing monomers.

Tin dibutyl dichloride, tin dimethyl dichloride and tin dibutyl dilaurate can be mentioned in particular.

EXAMPLE

The aim of the present example is to prepare different polythiourethane based perfumed glasses to measure their masking ability and to appreciate the masking odour.

The glasses are prepared using the following method:

1) Preparation of Compound X (Polyisocyanate Monomer)

The compound X is the compound of the following formula: $C_6H_4(CH_2NCO)_2$.

52 parts in weight of compound X and 0.01 parts in weight of tin dibutyl dichloride of formula $n(C_4H_9)_2Sn(Cl)_2$ are mixed. The blend is cold mixed at 10° C. for 30 minutes using a magnetic bar.

2) Preparation of Compound Y (Polythiol Monomer)

The compound Y to be used is the compound of the formula:

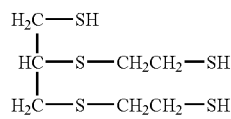

Depending on the cases, compound Y (in an amount equal to 48 parts in weight) is mixed with one of the following compounds or mixtures:
- cyclic ether (comparative example)
- Plastodor (comparative example)
- musk (comparative example)
- cyclic ether and musk (according to the invention)
- cyclic ether, musk and aldehyde derivative (according to the invention)
- cyclic ether, musk and Plastodor® (according to the invention)
- cyclic ether, musk, aldehyde derivative and Plastodor® (according to the invention).

The whole is mixed using a magnetic bar for about 30 minutes at a low temperature of about 10° C.

The monomers X and Y are mixed together for 60 minutes in a 5 kg volume double sheath preparation tube and equipped with a primary vacuum pump for degassing. Mixing occurs at a temperature of 10° C.

The formulation is then degassed with no stirring for 30 minutes.

The vacuum is then broken via dried dinitrogen.

The thus formulated mixture is injected through a 1.2 μm porosity filter in mould assemblies intended therefor in order to obtain a transparent optical glass.

Each assembly is made of two mineral glass moulds forming together a moulding cavity and maintained at their peripheries by means of an adhesive tape or a joining means.

Results

For each tested formulation, the odour as being released during the clipping operation is appreciated.

The clipping operation is a standard clipping on Kappa, with cooling water, for a mean period of time of 30 seconds. Appreciating the odour is done by 2 to 5 people located at less than 1 meter from the Kappa.

The results are appreciated based on the following criteria:

|  | Classification |
|---|---|
| 1) Smelling the residual sulphur odour (Masking ability) | |
| the sulphur odour is strong (nearly identical to the odour released during the clipping of the glass which does not comprise any masking agent nor any perfume) | ++ |
| the sulphur odour is moderate the decrease in the sulphur odour is noticeable | + |
| the sulphur odour is practically not or little noticeable | 0 |
| 2) Smelling perfume - Olfactory intensity of the resulting smell | |
| unnoticeable perfume (or very low perfume odour) | 0 |
| satisfactory smelt perfume odour and unpleasant odour | OK |
| too strong perfume odour and/or unpleasant odour | + |

The final result is satisfactory (OK) when the sulphur odour is nearly not or very little noticeable and when the smelt perfume odour is satisfactory and pleasant.

The final result is not satisfactory (NON OK) is the other cases.

In table I, formulations (comparative examples) containing one single additive (cyclic ether, musk or Plastodor®) have been tested.

TABLE I

| Additive | CAS No. | Parts in weight | Smelling the residual sulphur odour | Smelling the resulting odour (perfume) | Result |
|---|---|---|---|---|---|
| 1,8-cineole | 470-82-6 | 1.6 | + | OK | NON OK |
| Galaxolide ® | 1222-05-5 | 1.6 | + | OK | NON OK |
| Celestolide ® | 13171-00-1 | 1.0 | + | OK | NON OK |
| Tetralide ® | 1506-02-1 | 1.0 | + | OK | NON OK |
| Musk T ® | 105-95-3 | 1.0 | + | OK | NON OK |
| Plastodor ® FRD492 |  | 1.0 | + | OK | NON OK |

In table II are tested formulations according to the invention containing two additives.

TABLE II

| No | Additive A | Additive B | Parts in weight of A | Parts in weight of B | Smelling the residual sulphur odour | Smelling the resulting odour | Final result |
|---|---|---|---|---|---|---|---|
| 1 | 1,8-cineole | Galaxolide ® | 0.8 | 0.8 | 0 | OK | OK |
| 2 | 1,8-cineole | Galaxolide ® | 0.8 | 1.0 | 0 | OK | OK |
| 3 | 1,8-cineole | Galaxolide ® | 1.0 | 1.0 | 0 | OK | OK |
| 4 | 1,8-cineole | Musk T ® | 0.8 | 0.8 | 0 | OK | OK |
| 5 | 1,8-cineole | Musk T ® | 0.8 | 1.0 | 0 | OK | OK |

In table III are tested formulations containing three additives.

TABLE III

| No. | A | B | C | Parts in weight of A | Parts in weight of B | Parts in weight of C | Smelling the residual sulphur odour | Smelling the resulting odour | Final result |
|---|---|---|---|---|---|---|---|---|---|
| 6 | 1,8-cineole | Galaxolide ® | Plastodor ® FRD492 | 0.8 | 0.5 | 0.3 | 0 | OK | OK |
| 7 | 1,8-cineole | Galaxolide ® | Cis-4-heptenal | 0.8 | 0.5 | 0.05 | 0 | OK | OK |
| 8 | 1,8-cineole | Galaxolide ® | Cis-4-heptenal | 0.8 | 0.5 | 0.02 | 0 | OK | OK |
| 9 | 1,8-cineole | Galaxolide ® | Cis-4-heptenal | 0.8 | 0.3 | 0.02 | 0 | OK | OK |

In table IV are tested formulations containing four additives.

TABLE IV

| | Additives | | | Parts in weight | Parts in weight | Parts in weight | Parts in weight | Smelling the residual | Smelling the resulting | Final |
|---|---|---|---|---|---|---|---|---|---|---|
| No. | A | B | C | D | of A | of B | of C | of D | sulphur odour | odour | result |
| 10 | 1,8-cineole | Galaxolide ® | Plastodor ® FRD492 | Cis-4-heptenal | 0.8 | 0.5 | 0.3 | 0.02 | 0 | OK | OK |

The invention claimed is:

1. A polymerizable composition comprising:
   one or more polymerizable monomers containing at least one sulphur atom;
   at least one masking agent further defined as a cyclic ether selected from 1,8-cineole or 1,4-cineole; and
   at least one perfume further defined as a naturally occurring musk or extract thereof, a synthetic musk, and/or a mixture thereof.

2. The composition of claim 1, wherein the at least one monomer containing at least one sulphur atom is further defined as a precursor monomer of a polythio(meth)acrylate, a polythiourethane, a polythiourethane-urea and/or a polyepisulfide.

3. The composition of claim 2, wherein the composition comprises at least one polythiol monomer and at least one polyisocyanate monomer.

4. The composition of claim 3, wherein the polythiol has the formula:

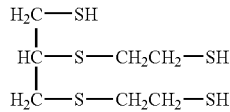

and the polyisocyanate is the compound of the formula $C_6H_4(CH_2NCO)_2$.

5. The composition of claim 1, wherein the synthetic musks are monocyclic, polycyclic and/or macrocyclic musks.

6. The composition of claim 1, comprising at least one of the following polycyclic musks:

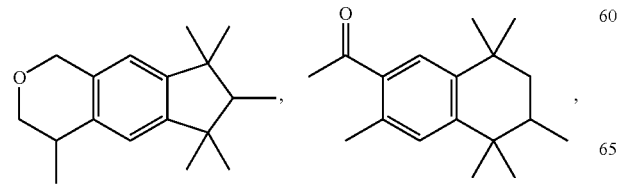

-continued

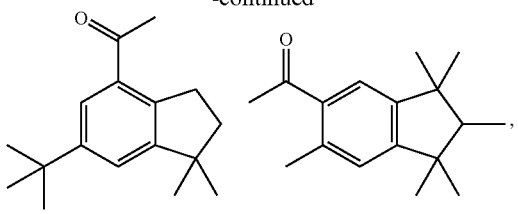

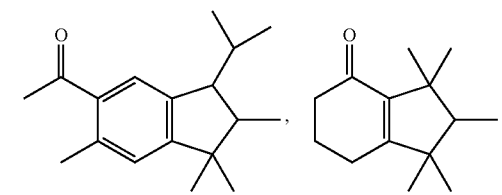

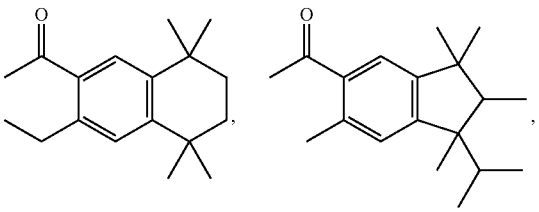

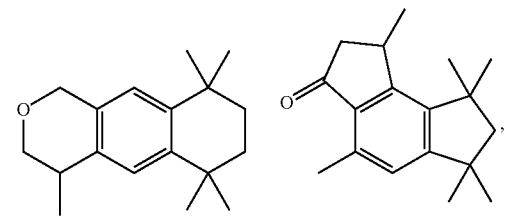

-continued

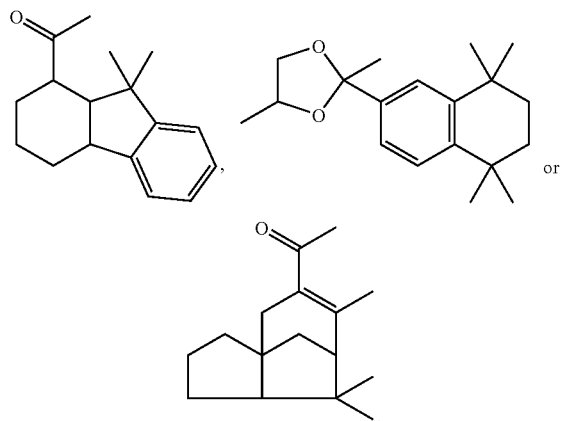

7. The composition of claim 1, comprising at least one of the following macrocyclic musks:

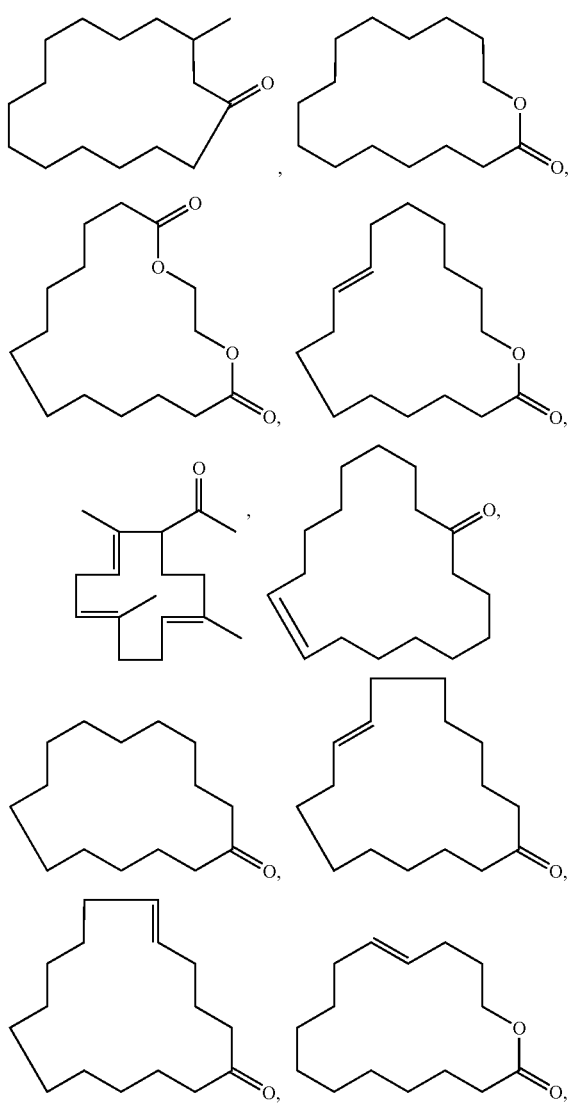

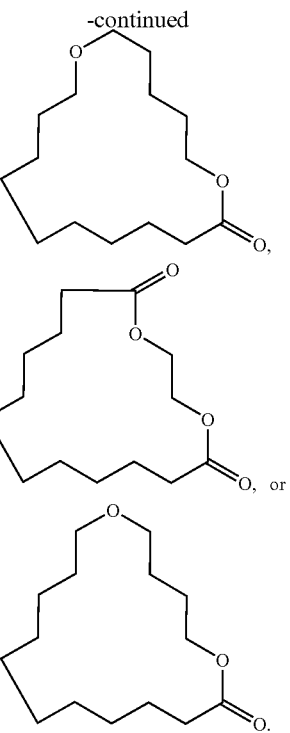

8. The composition of claim 1, wherein the masking agent(s) represent(s) 0.1 to 3 parts by weight per one hundred parts by weight of the polymerizable monomers.

9. The composition of claim 8, wherein the masking agent(s) represent(s) 0.8 to 1 parts by weight per one hundred parts by weight of the polymerizable monomers.

10. The composition of claim 1, wherein the perfume(s) represent(s) from 0.02 to 3 parts by weight per one hundred parts by weight of the polymerizable monomers.

11. The composition of claim 10, wherein the perfume(s) represent(s) from 0.3 to 1 parts by weight per one hundred parts by weight of the polymerizable monomers.

12. The composition of claim 1, further defined as comprising at least one aldehyde derivative.

13. The composition of claim 12, wherein the aldehyde derivative is an unsaturated $C_4$-$C_{14}$ aldehyde derivative.

14. The composition of claim 13, wherein the aldehyde derivative is cis-4-decenal or cis-4-heptenal.

15. The composition of claim 12, wherein the aldehyde derivative(s) represent(s) 0.005 to 1 parts by weight per one hundred parts by weight of the polymerizable monomers.

16. The composition of claim 15, wherein the aldehyde derivative(s) represent(s) from 0.02 to 0.1 parts by weight per one hundred parts by weight of the polymerizable monomers.

17. The composition of claim 1, further defined as comprising an additional compound P, wherein said additional compound P is a perfume or a mixture of perfumes that are different from the perfumes as defined in the preceding claims and further defined as at least one terpene, at least one aliphatic or aromatic ester, and/or at least one non-aromatic bicyclic compound comprising at least one double intracyclic link.

18. The composition of claim 17, wherein the additional compound P comprises from 60 to 90% by weight of terpene, from 2 to 15% by weight of aliphatic or aromatic ester and from 2 to 10% by weight of a non aromatic bicyclic compound comprising at least one double intracyclic link.

19. The composition of claim 18, wherein the at least one terpene is a limonene.

20. The composition of claim 19, wherein the at least one aliphatic or aromatic ester is ethyl methylphenyl glycidate or ethyl hexanoate.

21. The composition of claim 17, wherein the at least one non-aromatic bicyclic compound comprising at least one double intracyclic link is caryophyllene.

22. The composition of claim 17, wherein the additional compound P represents 0.05 to 1 parts by weight per one hundred parts by weight of the polymerizable monomers.

23. The composition of claim 22, wherein the additional compound P represents 0.1 to 0.5 parts by weight per one hundred parts by weight of the polymerizable monomers.

24. The composition of claim 1, wherein the masking agent(s) and the perfume(s) represent(s) together at least 1.5 parts by weight for one hundred parts by weight of polymerizable monomers.

25. The composition of claim 1, wherein the masking agent(s) and the perfume(s) represent(s) together at least 1.1 parts by weight for one hundred parts by weight of polymerizable monomers.

* * * * *